United States Patent [19]
Bright et al.

[11] Patent Number: 5,694,473
[45] Date of Patent: Dec. 2, 1997

[54] DECRYPTION OF RETRANSMITTED DATA IN AN ENCRYPTED COMMUNICATION SYSTEM

[75] Inventors: Michael W. Bright, Arlington Heights; Scott J. Pappas, Streamwood; Kevin G. Doberstein, Elmhurst, all of Ill.

[73] Assignee: Motorola, Inc., Schaumburg, Ill.

[21] Appl. No.: 650,071

[22] Filed: May 17, 1996

[51] Int. Cl.$^6$ .............................. H04L 9/18; H04L 9/00
[52] U.S. Cl. ........................................ 380/42; 380/48
[58] Field of Search ................... 380/37, 42, 48, 380/49, 44

[56] References Cited

U.S. PATENT DOCUMENTS

| | | | |
|---|---|---|---|
| 4,654,480 | 3/1987 | Weiss | 380/48 |
| 5,233,653 | 8/1993 | Katsurabayashi | 380/18 |
| 5,243,653 | 9/1993 | Malek et al. | 380/48 |

Primary Examiner—Thomas H. Tarcza
Assistant Examiner—Carmen D. White
Attorney, Agent, or Firm—Susan L. Lukasik

[57] ABSTRACT

A method of decrypting retransmitted parts of a message includes receiving (201) a message comprising encryption synchronization and a plurality of encrypted blocks. Until a first block of the plurality of encrypted blocks is received with error, a first keystream is generated (205) from the encryption synchronization and at least one of the plurality of encrypted blocks, and, using the first keystream, the plurality of encrypted blocks, received without error before the first block of the plurality of encrypted blocks is received with error, is decrypted (207). A priming block is determined (211) from the message. When the first block of the plurality of encrypted blocks is received with error, a second message is transmitted (219) requesting a retransmission of the first block. Upon receiving the retransmission of the first block without error, a second keystream is generated (223) from the priming block and the retransmission of the first block and decrypting the retransmission of the first block is decrypted (225) using the second keystream.

16 Claims, 4 Drawing Sheets

DECRYPTION OF RETRANSMITTED DATA IN AN ENCRYPTED COMMUNICATION SYSTEM

FIELD OF THE INVENTION

This invention relates to communication systems, including but not limited to encrypted communication systems. Reference is made to U.S. patent application Ser. No. 08/649,098, titled "DECRYPTION OF RETRANSMITTED DATA IN AN ENCRYPTED COMMUNICATION SYSTEM," filed on the same day as the present invention on behalf of Kevin G. Doberstein et al., with the same assignee as the present invention.

BACKGROUND OF THE INVENTION

Encrypted voice and data systems are well known. Many of these systems provide secure communication between two or more users by sharing one or more pieces of information between the users, thereby permitting only those users knowing the information to properly decrypt the message. Generally speaking, a key generator (KG) is used to encrypt or decrypt voice and data messages. A KG is a non-linear mathematical function that generates a pseudo-random sequence given an initial starting vector and a key variable that defines the mathematical function. The KG outputs a keystream that is XORed (exclusive "or" function, as is known in the art) with plain (unencrypted) text to generate cipher text. The cipher text is transmitted to a receiver. The receiver XORs the received cipher text with a keystream, determined by the receiver based on received information, yielding the plain text from the transmitting device.

In addition to having the same encryption key to decrypt an encrypted message, both the encrypting and decrypting encryption devices must be identical, i.e., perform the same encryption algorithm in the same way from the same (internal) encryption state at the same time. Synchronization (also known as sync) data is sent over the communication channel to enable the decrypting device to line up its encryption state with the encryption state of the encrypting device, after which proper decryption of the incoming message is performed. Encryption synchronization data, when used in encrypted communication systems, is often referred to as a message indicator (MI).

The encryption devices may be operated in one of several modes of operation. The mode of operation that the encryption device uses provides for different methods to synchronize the receiving device to the transmitting device. One mode of operation is known as cipher feedback (CFB). CFB provides for self synchronization. In other words, the data that is decrypted can also be used to initialize the KG. The data that is used to initialize the KG, however, will be decrypted incorrectly until the receiving KG is in sync with the transmitting KG. If two devices have different encryption states initially, but have identical encrypted streams fed into them, the devices will both self-synchronize to the encryption state of the encrypting device and output the same decrypted information after a certain number of bits are entered into the devices (depending on the length of the internal registers in the encryption device). Sending out sync data prior to the message helps the receiving device synchronize without loss of data. At the transmitter, a KG is initialized by an MI. The encryption algorithm is executed to generate a keystream. The keystream is then XORed with plain text to generate cipher text. The cipher text is then fed back into the input of the KG to generate the next keystream data. This process is repeated for all of the data. At the receiver, the MI is used to initialize the KG. The encryption algorithm is executed to generate the keystream. The received cipher text is XORed with the keystream to decrypt the data. The cipher text is also fed into the KG to generate the keystream for the next block.

It is desirable in many systems to have a throughput level of data that is consistent for both encrypted data and unencrypted data. When data is received, however, it is not uncommon for the data to be received in error. In many communications systems, it is known to request a retransmission of any data block that is received in error. Such retransmission of data provides a problem in encrypted data systems. Due to the synchronized nature of the encryption process, it is necessary to decrypt N−1 blocks while decrypting a selective retry block N. This property greatly decreases the throughput in an encrypted data system, creating a significant difference in throughput between encrypted and unencrypted data. Typical system implementations include waiting until all blocks are received error-free before decrypting the message. Such a method adds processing delays after the receipt of the last block. Another method is to decrypt the prior N−1 blocks while decrypting a selective retry block N. This method takes (N−1) times the decryption time longer to decrypt a selective retry. In essence, this method requires re-decryption of possibly an entire message that has already been decrypted just to decrypt one block.

Another solution to the retransmission decryption problem is to transmit synchronization information, or MI, for each data block. Such a solution increases the time and energy it takes to both transmit and receive messages. Subsequent retransmission of an MI may also be received in error, requiring further retransmissions.

Accordingly, there is a need for a method of decrypting data after retransmission of some of the blocks is received by the receiving unit without adding unnecessary delays to the decryption process. Additionally, such a method should provide consistent data throughput levels for both encrypted and unencrypted data.

DESCRIPTION OF THE PREFERRED EMBODIMENT

Figure 1:
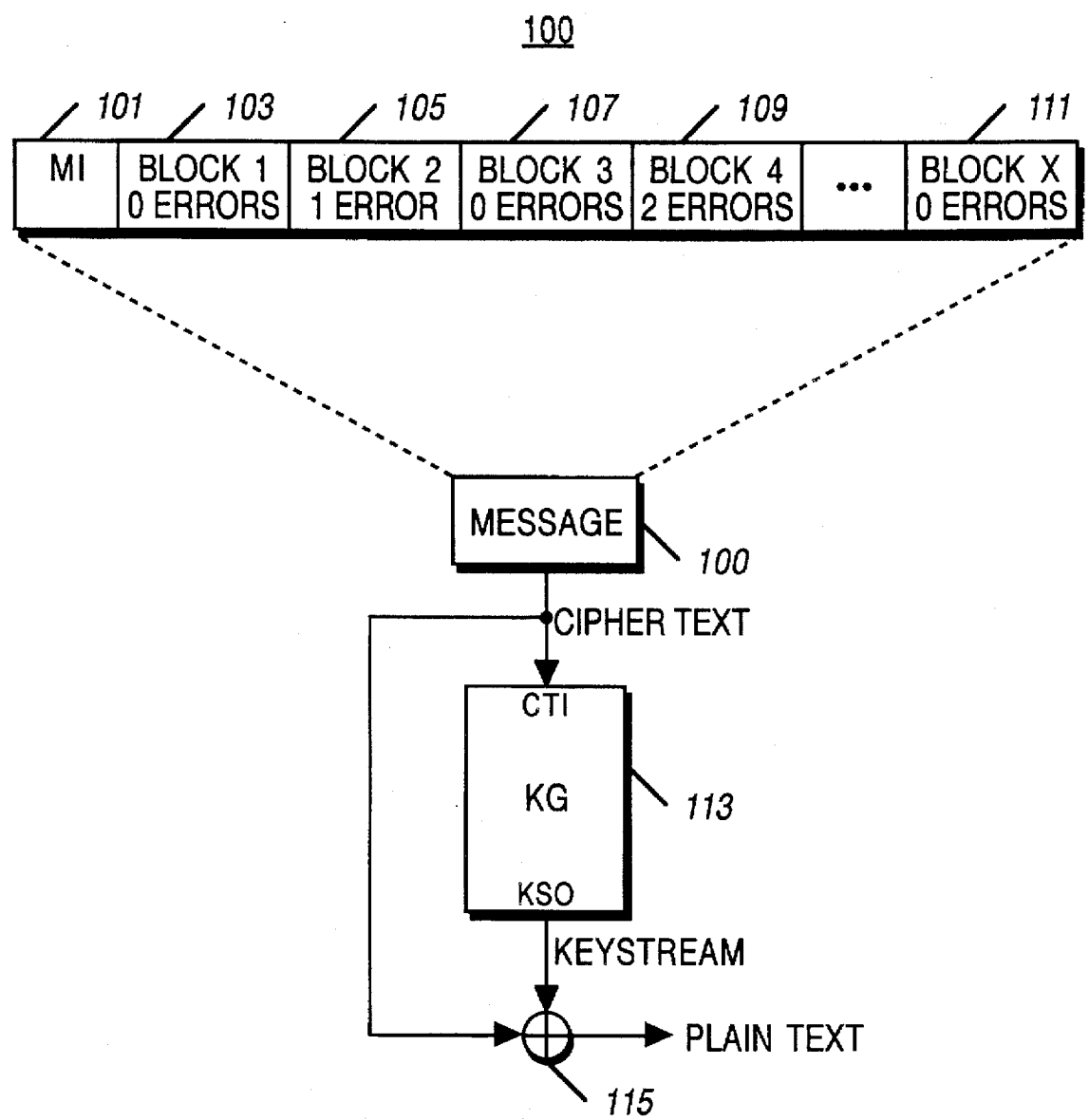
FIG. 1 is a block diagram of a received message as input to a key generator operating in CFB mode in accordance with the invention.

The following describes a method of decrypting retransmissions of encrypted data, where the retransmission does not comprise a transmission of an entire message. Upon initial receipt of an encrypted data message comprised of a plurality of blocks, the received blocks are determined to be in error or not in error. A priming block is stored for parts of the message received in error. A request for retransmission of blocks received in error is made. When the retransmitted blocks are received without error, the priming block is pulled from storage from the initial receipt of the encrypted data message. In this way, it is not necessary to wait until the entire message is received or to redecrypt data in order to decrypt the entire message. Thus, decryption of selected parts of the message is accomplished without unnecessary delays or redundant work.

A method of decrypting retransmitted parts of a message includes receiving (201) a message comprising encryption synchronization and a plurality of encrypted blocks. Until a first block of the plurality of encrypted blocks is received with error, a first keystream is generated (205) from the encryption synchronization and at least one of the plurality of encrypted blocks, and, using the first keystream, the plurality of encrypted blocks, received without error before the first block of the plurality of encrypted blocks is received with error, is decrypted (207). A priming block is determined (211) from the message. When the first block of the plurality of encrypted blocks is received with error, a second message is transmitted (219) requesting a retransmission of the first block. Upon receiving the retransmission of the first block without error, a second keystream is generated (223) from the priming block and the retransmission of the first block and decrypting the retransmission of the first block is decrypted (225) using the second keystream.

A block diagram of a received message as input to a key generator operating in CFB mode is shown in FIG. 1. A received message 100 typically comprises a message indicator (MI) 101. MI 101 is used to synchronize the internal states of encryption devices, known as key generators or KGs. Block 1 103 is received with 0 errors. Block 2 105 is received with 1 error. Block 3 107 is received with no errors. Block 4 109 is received with 2 errors. Block X 111 is received with zero errors, where X is an integer denoting how many encrypted blocks are received in the message 100. In a system in which erroneous blocks are requested to be retransmitted, a retransmission request is transmitted for erroneous blocks, in this case for block 2 105 and block 4 109, assuming that all blocks between block 4 and block X were received without error.

The received message 100 is input as cipher text to the CTI (cipher text in) input of a KG 113. The KG 113 processes the CTI into a keystream using the encryption algorithm of the KG 113. The keystream is XORed by an XOR gate 115 with the cipher text input to the KG, yielding plain text, i.e., unencrypted data, and the decryption process is complete. Because the KG 113 is operating in CFB mode, the KG 113 is self-synchronized. Data will be decrypted incorrectly until the encryption state of the receiving KG 113 is in sync with the KG that transmitted the message 100. If two devices have different encryption states initially, but have identical encrypted streams fed into them, the devices will both self-synchronize to the encryption state of the encrypting device and output the same decrypted information after a certain number of bits are entered into the devices (depending on the length of the internal registers in the encryption device). In the preferred embodiment, 64 bits are used.

Transmitting encrypted data as sync data prior to the message helps the receiving KG synchronize without loss of data. The encrypted data used to synchronize the KG will be referred to as a priming block. In the preferred embodiment, for a block N of data, the priming block is the last 64 bits of data from block N–1, i.e., the block of data received immediately before receiving block N. When N=1, the priming block is the MI 101, which is the sync data transmitted prior to the message data. The transmitter's (encrypting) KG is initialized by the same MI 101.

To decrypt the middle or end of a message without first decrypting the beginning of the message, e.g., to first decrypt block 107 of the received message 100 without first decrypting block 103 and block 105, the KG 113 is primed with the last bits of encrypted data from the previously received block 105 to prevent loss of data. Priming the KG 113 comprises inputting the priming block into the KG 113. After priming the KG 113, when the next bit of data from the encrypted message is input to the KG 113, i.e., the first bit of block 107 is input to the KG 113, the first bit of decrypted data is output as plain text. The process is repeated as the remaining bits of encrypted data are input to the KG 113 until all the data in the received message is decrypted.

In cipher feedback systems, if one block is received in error, correct decrypting of the following block is not possible because at least part of the previous cipher text block is the current block's priming block, which is used to generate the correct keystream to decrypt the block. In order to start decrypting a message from some starting point other than the beginning, the state of the KG at the end of the previous block is retained is the preferred embodiment by storing as the priming block at least part of the last block correctly received before the block receiving in error. When the first block of the message is received in error, the MI is marked and stored as the priming block.

Figure 2:
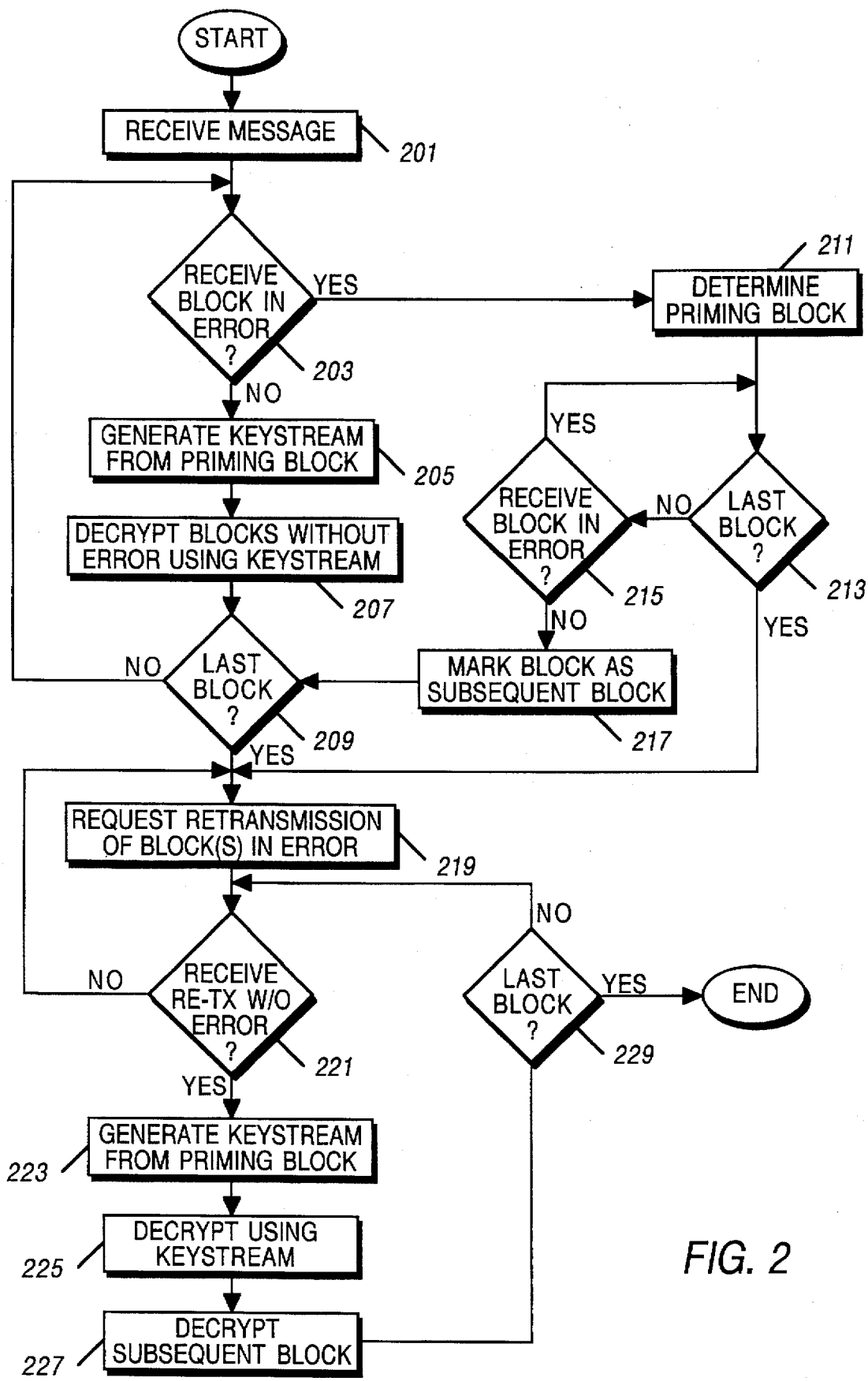
FIG. 2 is a flowchart showing a method of decrypting a cipher feedback encrypted message when retransmission of erroneous data blocks has occurred in accordance with the invention.

A method of decrypting a cipher feedback encrypted message when retransmission of erroneous data blocks has occurred is shown in the flowchart of FIG. 2. At step 201, a message 100 is received. If at step 203, a block is received without error, the process continues with step 205, where keystream is generated from a priming block. In the preferred embodiment, for a block N of data, the priming block is the last 64 bits of data from block N–1, i.e., the previous block of data. When N=1, i.e., for the first block 103 of the message, the priming block is the MI 101. Each block of data has a different priming block, as determined by the above method. A priming stream is comprised of the priming block followed by the cipher text or encrypted data. For example, if the encrypted data is found in blocks 103 through 111, the priming block is the MI 101 and the encrypted data in blocks 103 through 111 for the priming stream. The priming stream is used to generate the keystream as follows. The priming stream is input into the CTI input of the KG 113. The KSO output of the KG 113 is the keystream necessary to decrypt the cipher text that was input to the KG as part of the priming stream.

At step 207, the blocks received without error are decrypted using the keystream. If there are more blocks in the message 100 at step 209, the process continues with step 203. If a block is received in error at step 203, a priming block is determined at step 211. The last received block, which was received without error, is marked as a priming block at step 211 for the particular block received in error. If the first block 103 of encrypted data is received in error, i.e., the first block received in error is the first block of the message received in time, then the MI 101 is the priming block at step 211. At step 213, if there are more blocks remaining to be decrypted in the message 100, the process continues with step 215. If there are no more blocks left in the message 100 at step 213, the process continues with step 219. At step 215, if the block is received correctly, that block is marked at step 217 as a subsequent block to be decrypted later and to be used as a priming block for the next received block in the preferred embodiment, and the process continues with step 209. If the block was received in error at step 215, the process continues with step 213.

At step 219, the communication unit requests retransmission of any blocks received in error, i.e., needed blocks. When blocks for which retransmission was requested are received without error at step 221, i.e., the needed blocks are received without error, the keystream is generated from the priming block, as determined at step 211 for this block, and the encrypted data for this retransmitted block. At step 225, the retransmission of the needed block(s) is decrypted using the keystream. In cipher feedback systems, if one block is received in error the following block will not be able to be decrypted because the previous cipher text block is used to generate the current block's priming stream (keystream). Thus, in the preferred embodiment, at step 227, the subsequent block is decrypted immediately after the needed blocks are decrypted, because the needed blocks provide the priming block needed to correctly decrypt the subsequent block. If there are more blocks to be received from the message 100 at step 229, the process continues with step 221, otherwise the process ends. Decryption of the retransmission of needed blocks may occur when a retransmission of any block is received without error, or when retransmission of two or more blocks is received without error, and so forth, or when retransmission of all needed blocks is received without error.

Figure 3:
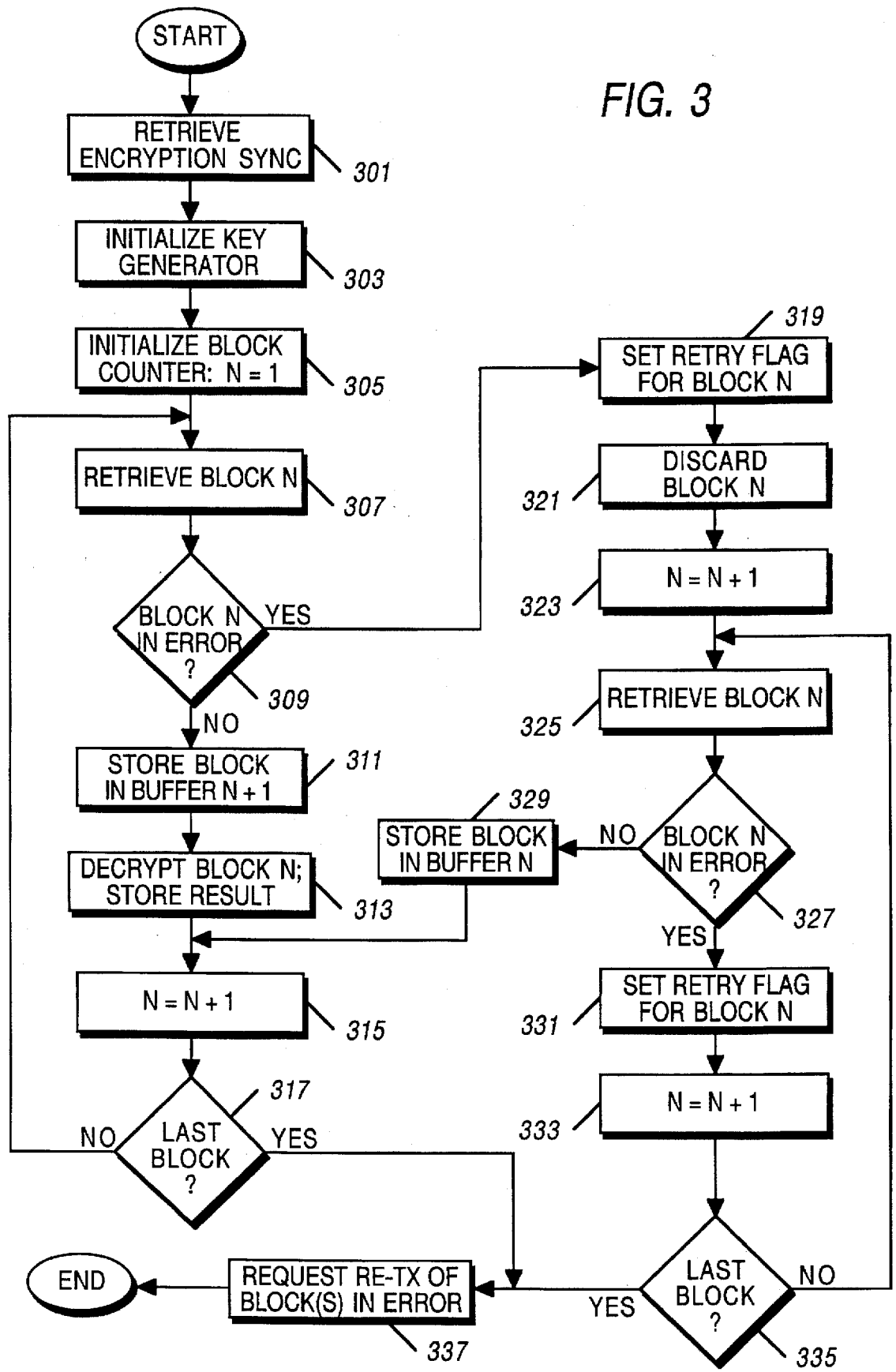
FIG. 3 is a flowchart showing a method of processing cipher feedback encrypted data in accordance with the invention.

A method of processing cipher feedback encrypted data is shown in the flowchart of FIG. 3 in accord with the preferred embodiment. This flowchart describes the actions taken when receiving an encrypted data message for the first time. At step 301, MI 101 is retrieved. At step 303, the key generator is initialized with the MI 101. The MI is used to synchronize the transmitting device to the receiving device. This synchronization is performed by initializing the input register of both the transmitting and receiving devices with the same information in the form of the MI 101, i.e., the same information, the MI 101, is that was input to the encrypting (transmitting) KG is input to the receiving KG 113. At step 305, the block counter, N, is initialized, i.e., N=1. At step 307, block N is retrieved from the message 100. If at step 309, block N was not received in error, i.e., block N was received correctly, the process continues with step 311. At step 311, block N is stored in buffer N+1 to be used as a priming block if block N+1 is received in error. At step 313, block N is decrypted and the result is stored. At step 315, the block counter is incremented, i.e., N=N+1. If block N is the last block of the message at step 317, the process continues with step 337, otherwise the process continues with step 307.

If at step 309 block N was received in error, the process continues with step 319. At step 319, a retry flag is set for block N. At step 321, block N is thrown away. At step 323, the block counter is incremented, i.e., N=N+1. At step 325, block N is retrieved. If at step 327, block N is received correctly, the process continues with step 329, where block N is stored in buffer N for subsequent decryption and may be used to reinitialize the receiving KG to the transmitting KG if the next block (N+1) is received without error, and the process continues with step 315. If at step 327, block N is received in error, the retry flag for block N is set at step 331. At step 333 the block counter is incremented, i.e., N=N+1. If block N is not the last block of the message 100 at step 335, the process continues with step 325, otherwise the process continues with step 337. At step 337, the communication unit requests retransmission of any blocks received in error, i.e., needed blocks, and the process ends. At this point in time, each needed block or group of consecutive needed blocks has a priming block stored for later use in generating a keystream when retransmission of the needed block or group of needed blocks is received without error.

Rephrasing a description for the flowchart of FIG. 3, a data block is received and checked to see if it was received correctly. If the block was received correctly, then the received block is stored in the received buffer at block N+1, where N is the current block number. The data is also decrypted and the result stored in decrypted text in buffer block N. The data block number is incremented, and it is checked to see if the entire message has been received. If not, the next data block is processed. If the data block is not received correctly, then the received data block is discarded, and the retry flag for the current data block is set. At this point, the received data for the previous block (correctly received) is stored in the buffer for the current block. The stored information is used as the initialization for the KG when the data for the erroneously received block is retransmitted. The next (subsequent) data block is retrieved. If the data is received correctly, the cipher text is stored in the buffer for block N. The block is not decrypted right away because the previous block was in error, and hence the KG will be out of synchronization with the transmitter. The retransmitted block, correctly received, will be used to reinitialize the KG for decryption of the subsequent block before returning to the main (error free) loop. At this point, as long as data blocks are received in error, the data is thrown away, and the retry bit set until the end of the message or until a data block is received without error.

Figure 4:
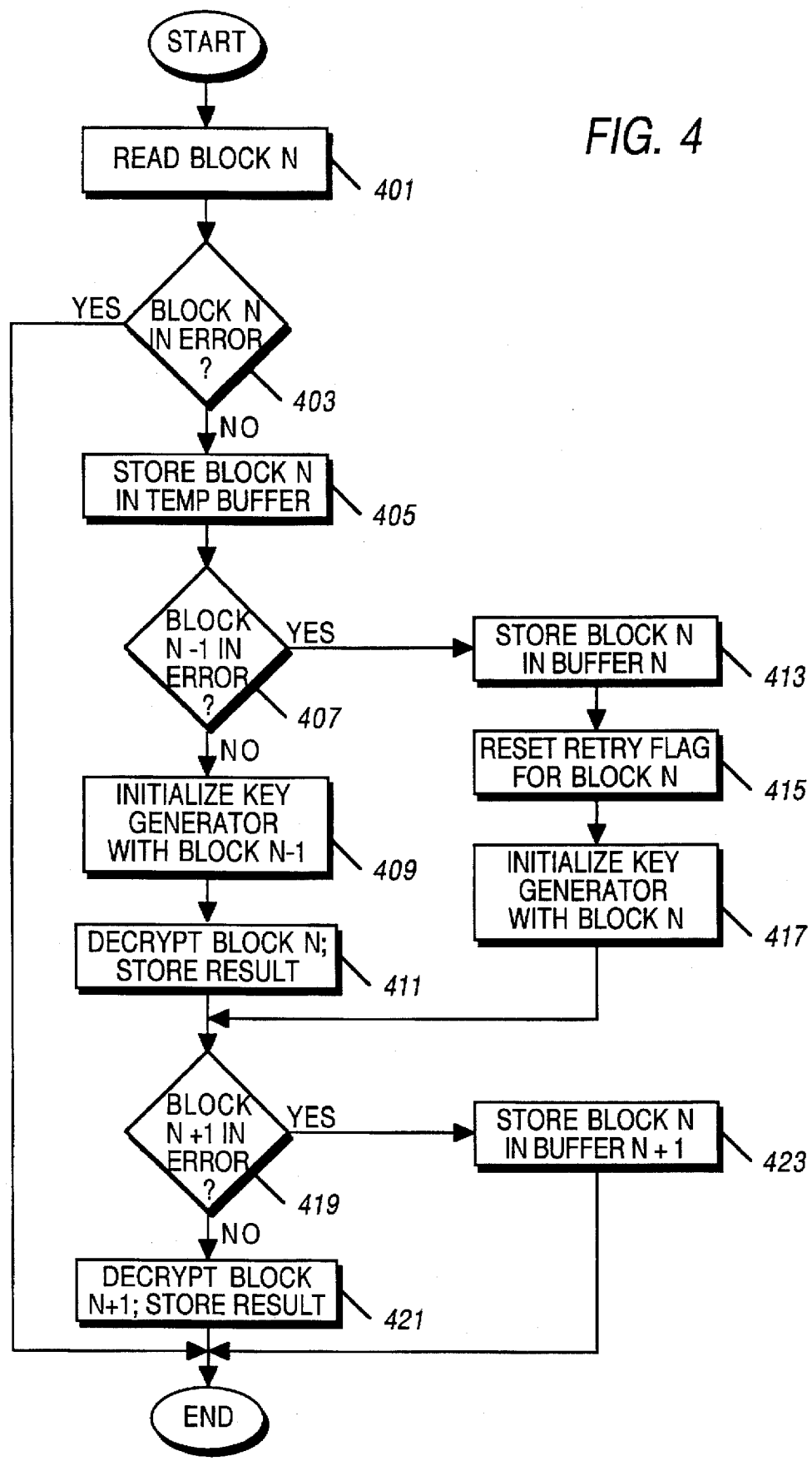
FIG. 4 is a flowchart showing a method of receiving and processing a retransmitted data block in accordance with the invention.

A flowchart describing the method used by a communication unit when receiving a retransmitted data block is shown in the flowchart of FIG. 4 in accord with the preferred embodiment. At step 401, block N is read, where block N is a block that is retransmitted to the communication unit upon request by the communication unit. If this block is received in error at step 403, the process ends. If the block was received correctly at step 403, the process continues with step 405, where block N is stored in a temporary buffer. At step 407, if block N−1 was correctly received in the original reception of the message, the process continues with step 409, where the KG is initialized with the cipher text from block N−1, which was stored as a priming block at step 311. Block N is then decrypted and the result stored at step 411.

If at step 407, block N−1 was received in error in the original reception of the message, the process continues with step 413, where block N is stored in buffer N. In the preferred embodiment, the cipher text is stored for block N at step 413 because it cannot be decrypted correctly now, because the priming block necessary to decrypt block N, i.e., information from block N−1, has not been received correctly at this time. In the preferred embodiment, this block will be decrypted after the previous block, N−1, is decrypted correctly. The retry flag for block N is reset at step 415. At step 417, block N is used as the priming block to initialize the KG 113, i.e., the priming block is input to the KG 113, and the process continues with step 419. If at step 419 block N+1 was received correctly in the original reception of the message, block N+1 is now decrypted because the KG 113 is now in sync, either from step 411 or 417, to decrypt block N+1, and the result is stored at step 421. If at step 419, block N+1 was received in error, block N is stored in buffer N+1 at step 423 to be used as the priming block when block N+1 is retransmitted (which is needed in the preferred embodiment if two or more blocks in a row are received in error, the retransmission of the first block is received correctly, and the second block is received in error), and the process ends.

The process of FIG. 4 is repeated for each block that is retransmitted. If after each block has been retransmitted there are still blocks that have not been received correctly, a request for retransmission of the blocks still remaining in error is made. Again, the process in FIG. 4 is repeated for each block that has been retransmitted. A request for retransmission of the blocks in error is made until all of the blocks are received correctly or until the communication unit has exhausted the maximum number of retries permitted for the communication unit.

The method of the flowcharts of FIG. 3 and FIG. 4 may be described as follows. The method comprises the steps of receiving a message comprising encryption synchronization and a plurality of encrypted blocks. The plurality of encrypted blocks comprises an Nth block, which Nth block is received without error, followed immediately by a M consecutive blocks received with error, followed immediately by L consecutive blocks received without error, where N and L are integers $\leq 0$, and M is a positive integer. When $N \leq 0$, a first priming block is determined from the message, a first keystream is generated from the priming block and the Nth block, and the Nth block is decrypted, using the first keystream. After receiving the M consecutive blocks received with error, a second priming block is determined from the message, and a second message is transmitted, requesting a retransmission of the M consecutive blocks received with error. Upon receiving the retransmission of the M consecutive blocks without error, a second keystream is generated from the second priming block and the retransmission of the M consecutive blocks, and the retransmission of the M consecutive blocks is decrypted using the second keystream.

In addition, in the preferred embodiment, the (N+M+1) block of the plurality of encrypted blocks is marked as a subsequent block. The subsequent block is decrypted immediately following decrypting the retransmission of the M consecutive blocks. Further, when N=0, the encryption synchronization is marked as the priming block, otherwise the priming block comprises Nth block.

In prior encryption systems, decryption is performed by generating a keystream as appropriate for the mode of encryption operation, and then immediately decrypting the encrypted message by combining (typically XORing for digital information) the keystream with the encrypted message to yield plain (unencrypted) text. The combining step can be simply and quickly performed in a microprocessor, running at, for example, 1 MHz. Generation of the keystream, however, is limited by the frequency at which the KG may be operated, typically 6 to 50 kHz. Hence, the actual time to both generate a keystream and decrypt the encrypted message is limited substantially by the maximum frequency at which the KG is run. The above method and its alternatives saves time over prior methods by storing and/or generating the appropriate information to minimize the rime to both receive and decrypt and entire message when retransmission of data is required.

What is claimed is:

1. A method comprising the steps of:
   receiving a message comprising encryption synchronization and a plurality of encrypted blocks;
   until a first block of the plurality of encrypted blocks is received with error, generating a first keystream from the encryption synchronization and at least one of the plurality of encrypted blocks and decrypting, using the first keystream, the plurality of encrypted blocks received without error before the first block of the plurality of encrypted blocks is received with error;
   determining a priming block from the message;
   when the first block of the plurality of encrypted blocks is received with error, transmitting a second message requesting a retransmission of the first block;
   upon receiving the retransmission of the first block without error, generating a second keystream from the priming block and the retransmission of the first block and decrypting the retransmission of the first block using the second keystream.

2. The method of claim 1, further comprising the steps of:
   marking a third block of the plurality of encrypted blocks as a subsequent block, which third block is received immediately after the first block is received; and
   decrypting the subsequent block immediately following decrypting the retransmission of the first block.

3. The method of claim 1, wherein the step of determining the priming block comprises using the encryption synchronization as the priming block when the first block of the plurality of encrypted blocks received with error is the first block of the plurality of encrypted blocks received in time.

4. The method of claim 1, wherein the step of determining the priming block comprises marking a second block of the plurality of encrypted blocks as the priming block, which second block is received immediately before the first block is received.

5. A method comprising the steps of:
   receiving a message comprising encryption synchronization and a plurality of encrypted blocks, wherein the plurality of encrypted blocks is comprised of N consecutive blocks received without error, followed immediately by M consecutive blocks received with error, followed immediately by L consecutive blocks received without error, where N, M, and L are positive integers;
   generating a first keystream from the encryption synchronization and the N consecutive blocks received without error and decrypting, using the first keystream, the N consecutive blocks received without error;
   determining a priming block from the message;
   after receiving the M consecutive blocks received with error, transmitting a second message requesting a retransmission of the M consecutive blocks received with error;
   upon receiving the retransmission of the M consecutive blocks without error, generating a second keystream from the priming block and the retransmission of the M consecutive blocks and decrypting the retransmission of the M consecutive blocks using the second keystream.

6. The method of claim 5, further comprising the steps of:
   marking the (N+M+1) block of the plurality of encrypted blocks as a subsequent block; and
   decrypting the subsequent block immediately following decrypting the retransmission of the M consecutive blocks.

7. The method of claim 5, wherein the step of determining the priming block comprises using the encryption synchronization as the priming block when the first block of the plurality of encrypted blocks received with error is the first block of the plurality of encrypted blocks received in time.

8. The method of claim 5, wherein the step of determining the priming block comprises marking the Nth block of the plurality of encrypted blocks as the priming block.

9. A method comprising the steps of:
   receiving a message comprising encryption synchronization and a plurality of encrypted blocks;
   until a first block of the plurality of encrypted blocks is received with error, generating a first keystream from the encryption synchronization and at least one of the plurality of encrypted blocks received without error and decrypting, using the first keystream, the at least one of the plurality of encrypted blocks received without error;

determining a priming block from the message;

when the first block of the plurality of encrypted blocks is received with error, marking as needed blocks all blocks consecutively received in error immediately after the first block is received;

transmitting a second message requesting a retransmission of the first block and the needed blocks;

upon receiving the retransmission of the first block and the needed blocks without error, generating a second keystream from the priming block and the retransmission of the first block and the needed blocks and decrypting the retransmission of the first block and the needed blocks using the second keystream.

10. The method of claim 9, further comprising the steps of:

marking a third block of the plurality of encrypted blocks as a subsequent block, which third block is received immediately after the erroneous blocks are received; and decrypting the subsequent block immediately following decrypting the retransmission of the first block and the needed blocks.

11. The method of claim 9, wherein the step of determining the priming block comprises using the encryption synchronization as the priming block when the first block of the plurality of encrypted blocks received with error is the first block of the plurality of encrypted blocks received in time.

12. The method of claim 9, wherein the step of determining the priming block comprises marking a second block of the plurality of encrypted blocks as the priming block, which second block is received immediately before the first block is received.

13. A method comprising the steps of:

receiving a message comprising encryption synchronization and a plurality of encrypted blocks, wherein the plurality of encrypted blocks comprises an Nth block, which Nth block is received without error, followed immediately by M consecutive blocks received with error, followed immediately by L consecutive blocks received without error, where N and L are integers $\leq 0$, and M is a positive integer;

when $N \leq 0$, determining a first priming block from the message, generating a first keystream from the priming block and the Nth block, and decrypting, using the first keystream, the Nth block;

after receiving the M consecutive blocks received with error, determining a second priming block from the message and transmitting a second message requesting a retransmission of the M consecutive blocks received with error;

upon receiving the retransmission of the M consecutive blocks without error, generating a second keystream from the second priming block and the retransmission of the M consecutive blocks and decrypting the retransmission of the M consecutive blocks using the second keystream.

14. The method of claim 13, further comprising the steps of:

marking the (N+M+1) block of the plurality of encrypted blocks as a subsequent block; and decrypting the subsequent block immediately following decrypting the retransmission of the M consecutive blocks.

15. The method of claim 13, further comprising the step of when N=0, marking the encryption synchronization as the priming block.

16. The method of claim 13, wherein the step of determining the priming block comprises marking the Nth block as the priming block.

* * * * *